Sept. 16, 1952 W. W. BETTS 2,610,687
ROTARY SCORING CUTTER ASSEMBLY
Filed Sept. 17, 1948
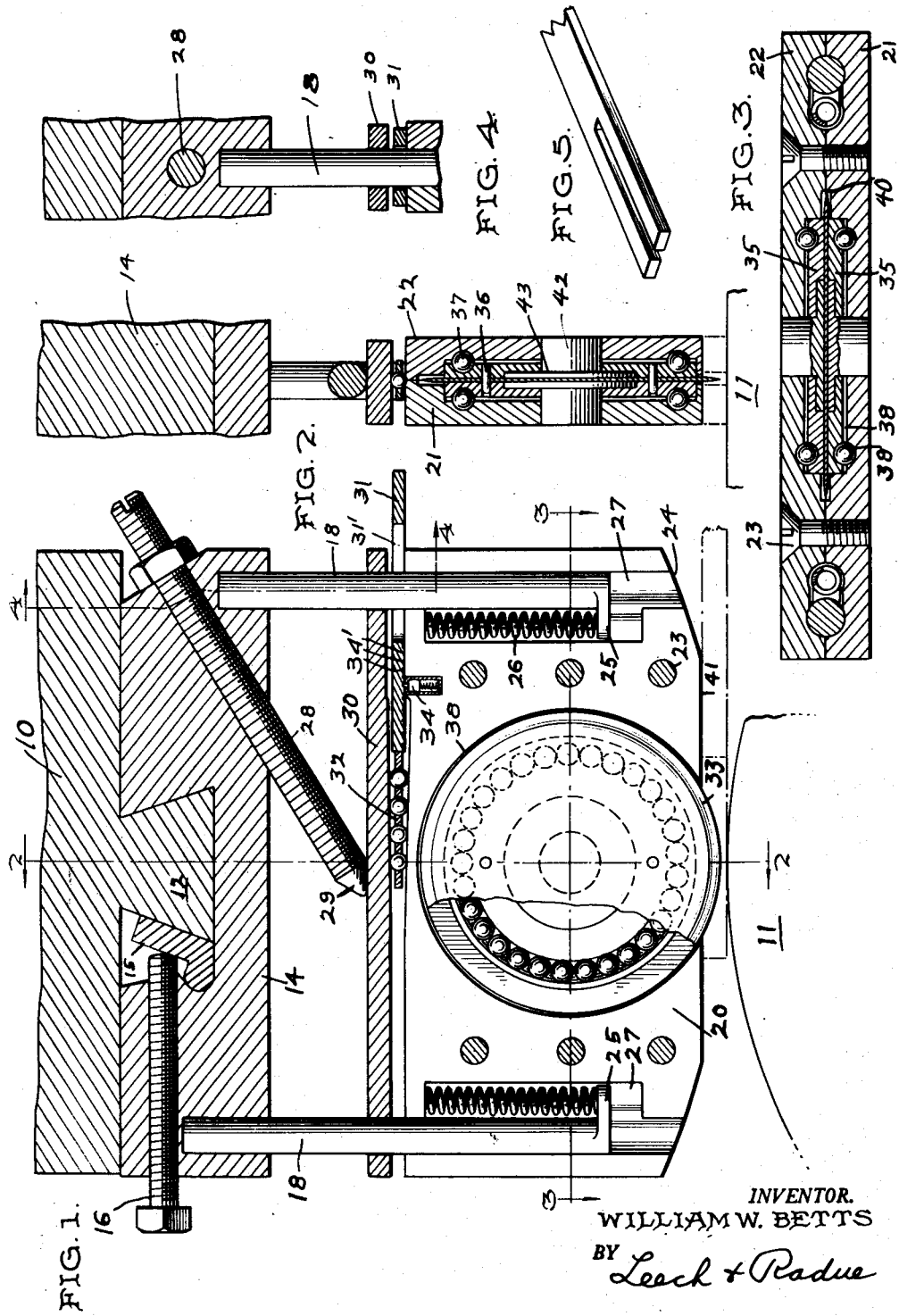
INVENTOR.
WILLIAM W. BETTS
BY Leach & Radue
ATTORNEYS Patented Sept. 16, 1952

2,610,687

UNITED STATES PATENT OFFICE 2,610,687

ROTARY SCORING CUTTER ASSEMBLY

William W. Betts, Binghamton, N. Y., assignor of five per cent to Mary Dilley, Binghamton, N. Y.

Application September 17, 1948, Serial No. 49,822

6 Claims. (Cl. 164—70)

This invention relates to cutting and scoring devices for use with cardboard box making machinery.

The general object of the present invention is to provide a novel and improved cutting and scoring device using a rotary disc cutter.

More particularly it is an object of the invention to provide a device for attachment to the under side of the cutter supporting bar of a paper cutting or scoring machine for use in cooperation with a rotary bed roll and including a block for attachment to the supporting bar, a cutter assembly, guide means for the assembly mounted on the block and dual adjusting means to position the assembly relative to the block.

An important object of the invention comprises the arrangement of the cutter assembly wherein a circular disc cutter is supported by abutting flange washers, each of which is received in a recess in one of the mating parts of a housing and is fitted with a portion of a ball race completed in the recess, whereby the working pressure exerted by the cutter causes it to be more tightly clamped between the flange washers.

An important feature of the cutter mounting comprises the arrangement of headed pins passing through and partially recessed in each washer for holding it assembled within its half of the housing, whereby the bearing balls cannot be lost when the cutter disc is removed for sharpening or replacing.

Another important feature resides in the use of an inclined adjustment screw extending diagonally through the block attached to the cutter supporting bar, available at the side thereof for adjustment and adapted to limit upward movement of the cutter assembly by engagement over the axis through the cutter center and its point of bearing on the bed roll.

Still another important feature resides in the use of a follower plate interposed between the stop member and the assembly and providing wedging action between the two whereby lateral adjusting movement effects the vertical positioning of the cutter.

A further important feature of the invention resides in the manner of housing the ends of the depending guide rods and their parallel positioned springs within the cutter housing.

Other and further objects and features of the invention will be more apparent to those skilled in the art upon a consideration of the accompanying drawing and following specification wherein is disclosed a single exemplary embodiment of the invention, with the understanding that such changes be made therein as fall within the scope of the appended claims without departing from the spirit of the invention.

In said drawing:

Fig. 1 is a transverse section through the cutter supporting bar and the mounting block for the cutter assembly, and showing the latter divided on its median plane with the cutter and one of its flanges broken away to show the ball bearing therefor;

Fig. 2 is a longitudinal central section on line 2—2 of Fig. 1;

Fig. 3 is a horizontal section on line 3—3 of Fig. 1;

Fig. 4 is a fragmental vertical section on broken line 4—4 of Fig. 1; and

Fig. 5 is a perspective view of the working end of a cutter setting gauge.

In making paper and pasteboard boxes and the like, the material used for blanks and covers is either cut or scored by being passed between a rotating bed roll and one or more circular knives supported above the same. The adjustment of the knife in its relation to the bed roll determines whether cutting or scoring is effected. The device of the present invention is intended to be applied singly or in multiple to the conventional cutter supporting member 10 of such a cutting and scoring machine for support by the same above the bed roll 11 thereof. The under surface of the cutter supporting bar is provided with a dovetailed rail 12 on its under surface to which is attached the block 14 forming a part of the present invention. This block is provided with a groove to receive the rail 12 and has the bottom and one side thereof properly shaped for close engagement therewith. A gib 15 is fitted in a recess at the side of this groove or channel and is held in the position shown by set screw 16 to lock against the other face of the rail and hold the block in adjusted position. Loosening the set screw permits the gib to rotate about its rounded lower end allowing the removal of the assembly from the cutter supporting bar or movement longitudinally thereof for adjustment to another position. The block is fitted with a pair of vertically depending cylindrical rods 18 near its ends which form guides for the cutter assembly 20 which will now be described.

The cutter assembly is all contained in a two part housing composed of cutter carrying blocks 21 and 22 of identical construction adapted to be fitted together face to face and secured by fastenings such as screws 23. The blocks are generally rectangular in form, with the lower corners cut away as at 24 for clearance. The two halves of the block are provided with mating grooves to receive and closely guide the assembly along the lower ends of the rods 18. These rods have inturned pedestals 25 on their lower ends upon which rest the expansion helical springs 26 arranged alongside of and parallel to the guide rods and bearing at the upper ends on the end walls of the spring recesses 27 in the cutter blocks, the arrangement being such that these springs tend to lift the cutter assembly toward the mounting block 14. Such movement is resisted and the setting of the assembly in respect to the surface of the bed roll 11 fixed by means of an adjusting screw 28 extending diagonally through the block 14 so that its outer end is readily and conveniently available for adjustment by a screw driver and a wrench for the lock nut.

The tapered or pointed end 29 of the set screw rests on the follower plate 30 at substantially the center thereof and in direct alignment over the cutter axis and the axis of the bed roller. The follower plate which moves loosely on the rods 18 is used in combination with a slidable strap 31 to permit rapid and relatively small changes in adjustment during the operation of the machine. It is guided by having a slot therein pass over one of the rods 18 and its inner end is fitted with a wedge 32 engaging cooperating inclined faces on the top of the cutter housing and the under side of the follower plate. A convenient way to form such a wedge is by the use of a plurality of balls of graduated size, as shown. Preferably these are so positioned that at least one of them is beneath or on one side of the axis shown as line 2—2, while one or more are on the other side, insuring alignment of the resistance to lift when cardboard is passed beneath the knife.

In order to insure against having the knife cut or damage the surface of the bed roll 11 under any conditions of adjustment, a rigid limiting stop is provided for the adjusting strap 31 such as by fixing the length of slot 31' which straddles the guide rods 18, as shown in Fig. 1. It will be clear that with the strap pushed in to its maximum and the adjusting screw 28 set to insure clearance of several thousandths of an inch between the knife and the bed roll, thereafter no adjustment of the strap 31 can damage the roll. The follower plate 30 and the strap 31 may have complementary smooth, inclined surfaces in place of the balls of varying diameter as shown, and for the sake of indicating the amount of adjustment effected by lateral movement of strap 31 and for holding this adjustment, a detent element 34 is spring pressed in a recess between the blocks 21, 22 and cooperates with spaced depressions 34' in the under face of the strap 31. The spacings between these may represent any desirable vertical adjustment, such as the difference between cutting and scoring on certain thickness of the box board, or the like. Obviously they may be arranged differently than shown to suit different users and serve to indicate to the attendant the position of adjustment as well as to insure its remaining fixed.

The cutter or knife 33 is a circular disc of thin steel of uniform thickness, having its circular periphery sharpened as shown and being imperforate at the center. Such a cutter is simple to make and cheap to replace or resharpen. It is reinforced against bending, supported and positioned for rotation by means of a pair of substantially identical flange washers 35 of uniform thickness and of less diameter than the cutter. They are adapted to engage opposite faces of the cutter and clamp the same tightly between them, particularly during the cutting operation, to insure steady movement thereof. The cutter is centered in respect to these washers by means of two or more pins 36 mounted in one of the washers, extending beyond the inner face thereof to pass through close fitting holes in the disc and correspondingly positioned holes in the mating washer.

Each washer has a circular groove of substantially half circular cross-section cut in its outer face near the periphery to act as a race for bearing balls 37. The inner face of each of the cutter blocks 21 and 22 is recessed as at 38 to receive one of the washers, with sufficient clearance to prevent binding, and the bottom of each of these recesses is provided with a groove 39 for cooperation with the groove in the face of the washer. The balls 37 in each of these sets of grooves or channels provide the bearings for the rotation of the cutter and its backing or flange washers and resist any lateral movement thereof. Each of the recesses 38 is counterbored as at 40 to provide clearance for the edge of the knife and the center of the knife is so positioned with respect to the lower edge 41 of the cutter housing that a segment of the cutter, but none of the washers, projects below this face. This projection is sufficient for the maximum depth of cut required by the knife.

In order that each washer may remain in position in its cutter block recess so that the bearing balls are not lost when the housing is separated for changing or sharpening the knife, means is provided for fastening each of the washers rotatably in position. Such means takes the form of a stud 42 having a large flat head 43 less than half as thick as the washer. This head is received in a recess in the inner face of the washer just slightly deeper than the thickness of the head and the stud passed loosely through an opening in the center of the washer but is tightly received in a bore in its housing block. Either a pressed fit or set screw may be used to hold it in position. The arrangement is such that the washer rotates freely in spite of the stud, with its head therein, but cannot be removed without intentionally removing the stud.

By observing in particular Fig. 2, it will be seen that the upward pressure exerted on the knife as it is cutting cardboard fed between it and the bed roll produces a tendency to lift the cutter and its washers through the action of their pins 36 and thus causes a double wedging action of the upper and lower groups of balls in the races, which tend to press the washers more tightly together against the cutter, automatically insuring tight clamping the whole time it is being used without requiring any unusual pressure to be exerted on it at times of rest. This eliminates requirements for extremely accurate fitting at the time of manufacturing the devices and reduces the cost thereof for this reason.

In Fig. 5 is shown in solid lines and in Figs. 1 and 2 in dotted lines a setting gauge comprising a metal strap slotted at the end for clearance of the knife blade. These gauges are provided in various thicknesses to determine the clearance desired between the bed roll and the under face 41 of the knife assembly. If the projection of the knife beyond this face 41 is known it can be determined how close the cutting edge is positioned above the bed roll either for actual severing of the paper or for scoring to any desired depth.

I claim:

1. A cutter assembly for a rotary cutting and scoring device comprising in combination, a thin, circular disc sharpened on its periphery to form a cutter, a pair of flange washers of lesser diameter than the disc to support and guide said cutter, cooperating means in said flange washers and disc to connect and center the parts, a circular groove in the outer face of each washer near its periphery, a pair of mating knife holder blocks, the confronting face of each of said blocks being recessed to closely fit and receive one of said washers and to provide clearance for the cutter, a segment of the cutter being exposed beyond an edge of said assembled blocks, a groove in the bottom walls of each recess for cooperation with that in the washer received therein, balls in the channels formed by the confronting grooves to form the sole bearings for the cutter and to clamp the discs thereagainst as radial pressure is applied to the exposed knife edge and means securing said blocks together.

2. The assembly as defined in claim 1 in which means are provided to hold each washer in its block recess when the blocks are separated whereby the cutter may be removed for sharpening or replacement.

3. The assembly as defined in claim 2 in which said means comprise a headed rod secured in each block, passing through a central aperture in the washer and having its head recessed in the washer.

4. A cutter assembly comprising in combination a housing including blocks meeting in a median plane, a thin cutter disk housed and rotatable in recesses in the meeting faces of said block and having a segment extending beyond one edge of the housing, a disc washer on each side of the cutter reinforcing and supporting the same for rotation, interengaging means on washers and cutters to prevent relative movement thereof in the respective planes of the parts, cooperating and confronting ball races in the outer faces of the washers and in the blocks, and balls in said races journalling the disc-washer set in the housing.

5. The cutter assembly as defined in claim 4 in which each washer is held to its housing block by a central stud passing therethrough and having an enlarged head received in a recess in the inner face of the washer.

6. A housing and mounting assembly for a thin circular disc cutter comprising in combination, a block having a recess therein, facing ball races in said block, a thin circular disc cutter, flange washers abutting opposite faces of said disc to reinforce and support the same in said recess, means preventing relative lateral and rotary movement of the disc and washers, ball races on the outer faces of said washers to cooperate with the first races and balls in said races to support the cutter and washers and to cause the washers to clamp the disc more tightly as lateral cutting pressure is applied to the cutter.

WILLIAM W. BETTS.

REFERENCES CITED

The following references are of record in the file of this patent:

UNITED STATES PATENTS

| Number | Name | Date |
| --- | --- | --- |
| 212,315 | Lodge | Feb. 18, 1879 |
| 511,563 | Thyll | Dec. 26, 1893 |
| 1,579,995 | Aubuchont | Apr. 6, 1926 |
| 1,750,718 | Lenston | Mar. 18, 1930 |
| 1,794,398 | Cameron | Mar. 3, 1931 |
| 2,242,514 | DeSmith | May 20, 1941 |